US010688451B1

(12) United States Patent
Santoiemmo

(10) Patent No.: US 10,688,451 B1
(45) Date of Patent: Jun. 23, 2020

(54) SELECTED SERVING AND FLAVORED SPARKLING BEVERAGE MAKER

(71) Applicant: Carl Santoiemmo, Twinsburg, OH (US)

(72) Inventor: Carl Santoiemmo, Twinsburg, OH (US)

( * ) Notice: Subject to any disclaimer, the term of this patent is extended or adjusted under 35 U.S.C. 154(b) by 315 days.

(21) Appl. No.: 15/595,803

(22) Filed: May 15, 2017

(51) Int. Cl.
| | |
|---|---|
| *B01F 3/04* | (2006.01) |
| *B01F 15/02* | (2006.01) |
| *A23L 2/54* | (2006.01) |
| *A23L 2/56* | (2006.01) |
| *B67D 1/04* | (2006.01) |
| *B01F 15/00* | (2006.01) |
| *B67D 1/00* | (2006.01) |

(52) U.S. Cl.
CPC ............ *B01F 3/04808* (2013.01); *A23L 2/54* (2013.01); *A23L 2/56* (2013.01); *B01F 3/04787* (2013.01); *B01F 15/0212* (2013.01); *B67D 1/0406* (2013.01); *B01F 15/0035* (2013.01); *B67D 1/0071* (2013.01)

(58) Field of Classification Search
CPC .............. B01F 3/04099; B01F 3/04787; B01F 3/04794; B67D 1/0071; B67D 1/0406
USPC .................. 99/323.1, 323.2, 295; 261/DIG. 7
See application file for complete search history.

(56) References Cited

U.S. PATENT DOCUMENTS

| | | | | |
|---|---|---|---|---|
| 3,628,444 A | * | 12/1971 | Mazza ................. | A47J 31/3695 99/275 |
| 6,712,342 B2 | * | 3/2004 | Bosko ..................... | B01D 61/08 261/104 |
| 8,250,972 B2 | * | 8/2012 | Santoiemmo ........ | B67D 1/0888 261/DIG. 7 |
| 2010/0107887 A1 | * | 5/2010 | Bentley .................... | A47J 31/44 99/288 |
| 2010/0266742 A1 | * | 10/2010 | Ferreira ............... | B01D 5/0015 426/477 |
| 2014/0239521 A1 | * | 8/2014 | Ergican ................ | B67D 1/0058 261/115 |
| 2016/0059192 A1 | * | 3/2016 | Jeong ........................ | F25C 5/22 99/323.2 |

* cited by examiner

*Primary Examiner* — Reginald Alexander
(74) *Attorney, Agent, or Firm* — Gugliotta & Gugliotta LPA

(57) ABSTRACT

A beverage maker is provided having a filtered water system for processing pressurized potable water, a flavor infusion system, and a beverage discharge. Purified filtered water is thereby directed alternately directly to a beverage discharge, or through the flavor infusion system to the beverage discharge. An additional water carbonation system may be incorporated between the filtered water and the flavor infusion system such that carbonated, filtered water may be directed alternately directly to a beverage discharge, or through the flavor infusion system to the beverage discharge. The beverage maker is capable of alternately dispensing filtered, flavored, carbonated or noncarbonated water based beverages.

20 Claims, 8 Drawing Sheets

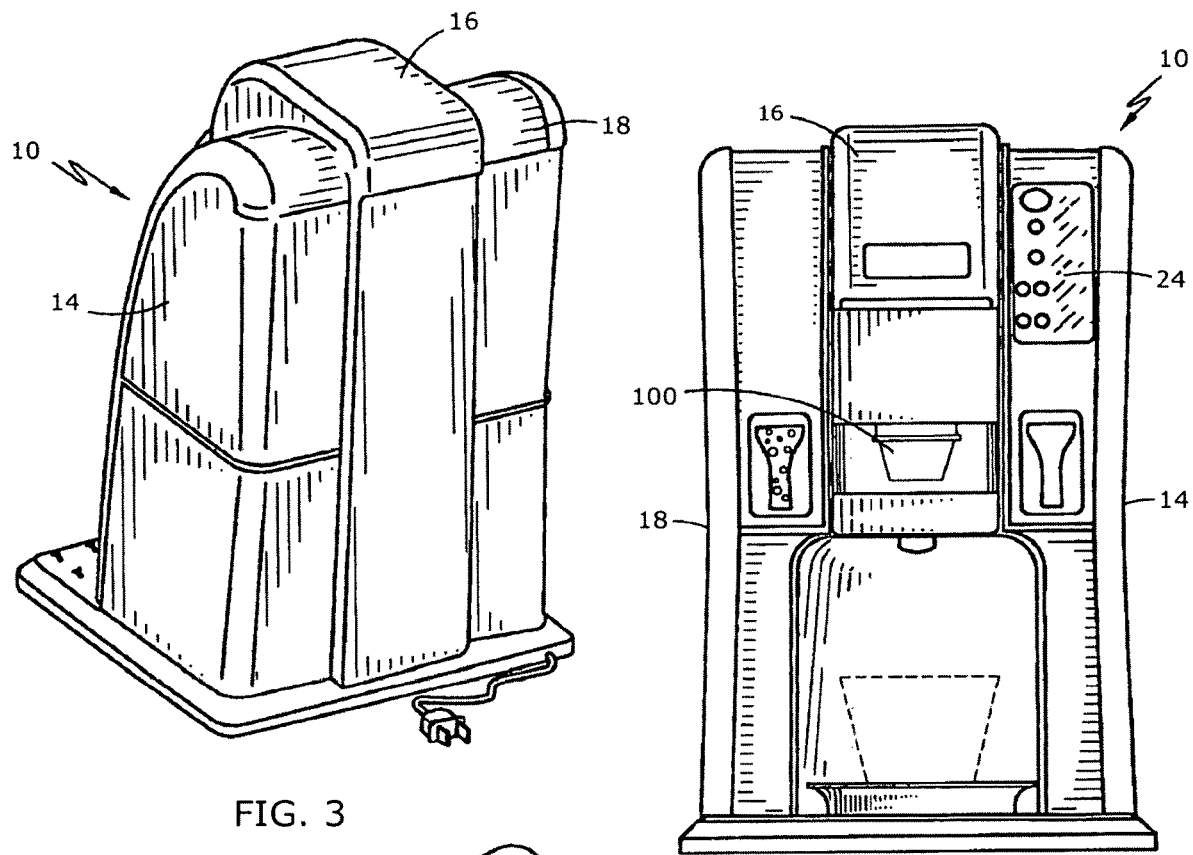
FIG. 3
FIG. 4
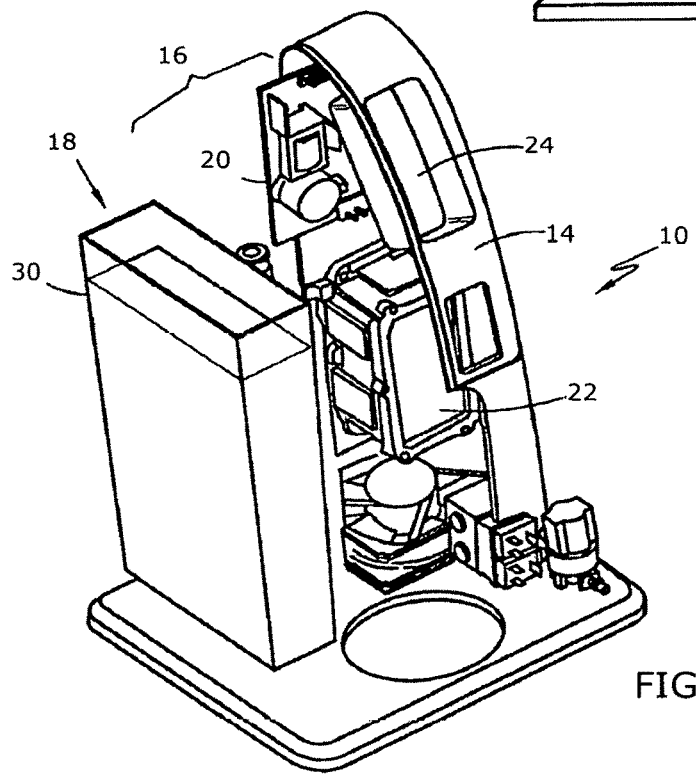
FIG. 5

SELECTED SERVING AND FLAVORED SPARKLING BEVERAGE MAKER

RELATED APPLICATIONS

The present invention is an improvement of, but does not claim benefit of, U.S. Pat. No. 8,833,241 issued on Sep. 16, 2014.

BACKGROUND OF THE INVENTION

1. Field of the Invention

The present invention relates generally to method and a device to make a single or a multiple serving of a select purified filtered, flavored, carbonated beverage.

2. Description of the Related Art

Beverage makers for hot beverages have existed for single serve applications. Single serve cold beverage makers have also been pioneered by the present inventor, and include on-demand, in situ single dose cold beverage machines capable of creating a sparkling or non-sparkling flavored water, juice or soda.

Examples of the present inventor's prior developments include U.S. Pat. No. 8,250,972 for a select serving and flavored sparkling beverage maker. Such a device provides a mechanism for combined chilled water and carbon dioxide through a single serving, disposable flavor cup to create a system for single serving 'post mix' flavored sodas.

Since this development, additional problems associated within the commercial consumer market have been discovered, some through trial and error and some through changes in consumer preferences. First, variations in water quality throughout various geographic areas and from various municipal water systems can result in inconsistent results in the operation of such devices. Second, concerns about contaminants and impurities within municipal water have come to the forefront of the consuming public due to high profile lapses in water quality that have resulted in poisoning at worst, and illness at best to large populations. And third, changes in the consumer's appetite has resulted in filtered and purified bottled water overtaking carbonated and flavored sodas in overall market share, with such trends seemingly to be continued into the foreseeable future.

Consequently, what is therefore needed, and not provided in the prior art, is for incorporating a system for filtering or purifying water into such beverage machines such as to provide consistency of water or, alternately, for merely dispensing filtered, chilled water.

SUMMARY OF THE INVENTION

It is thus an object of the present invention to provide filtered water for either dispensing as a beverage or for use in the making of single serving flavored or unflavored, carbonated or uncarbonated beverages.

It is an object of the present invention that the beverage may be a water, a juice or a soda; however, it is envisioned that the beverage is individually customized to comprise a select amount of a flavor.

It is an object of the present invention to provide a means to control the amounts of sugar, the vitamins and the minerals added to sparkled beverages.

It is an advantage of the foregoing object that the present invention encourages a more healthy diet and lifestyle.

It is an object of the present invention to comprise a means to regulate and to control the beverage temperature.

It is an object of the present invention to provide a means to regulate the level of carbonation.

It is a further object of the present invention to provide a means to regulate and the select the flavor of the sparkling beverage at the time the beverage is dispensed.

It is an advantage of the foregoing means to provide an immediate and a continued freshness to the beverage.

It is another object of the present invention to provide a means to switch between a sparkling fruit juice selection, a healthy soda selection and a sparkling water selection.

It is yet another object of the present invention to provide all of the benefits the foregoing objects entail.

Further objects of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 3 is a rear perspective view thereof;

FIG. 4 is a front elevational view thereof;

FIG. 5 is a front perspective view thereof shown in a partially exploded view having an outer housing 12 removed;

DESCRIPTION OF THE PREFERRED EMBODIMENTS

The best mode for carrying out the invention is presented in terms of its preferred embodiment, herein depicted within the Figures. As described below, a preferred embodiment, as anticipated at the time of filing, is identified and described as exemplary of the teachings of the present invention. However, the disclosure is not intended to be narrowly construed by this exemplary embodiment, as one skilled in the art would know that the operational and functional equivalent of many of the components, systems, steps and processes taught herein could be modified or replaced by equivalent components, systems, steps and processes and still remain within the spirit and teachings of the present invention.

1. Detailed Description of the Figures

Figure 1:
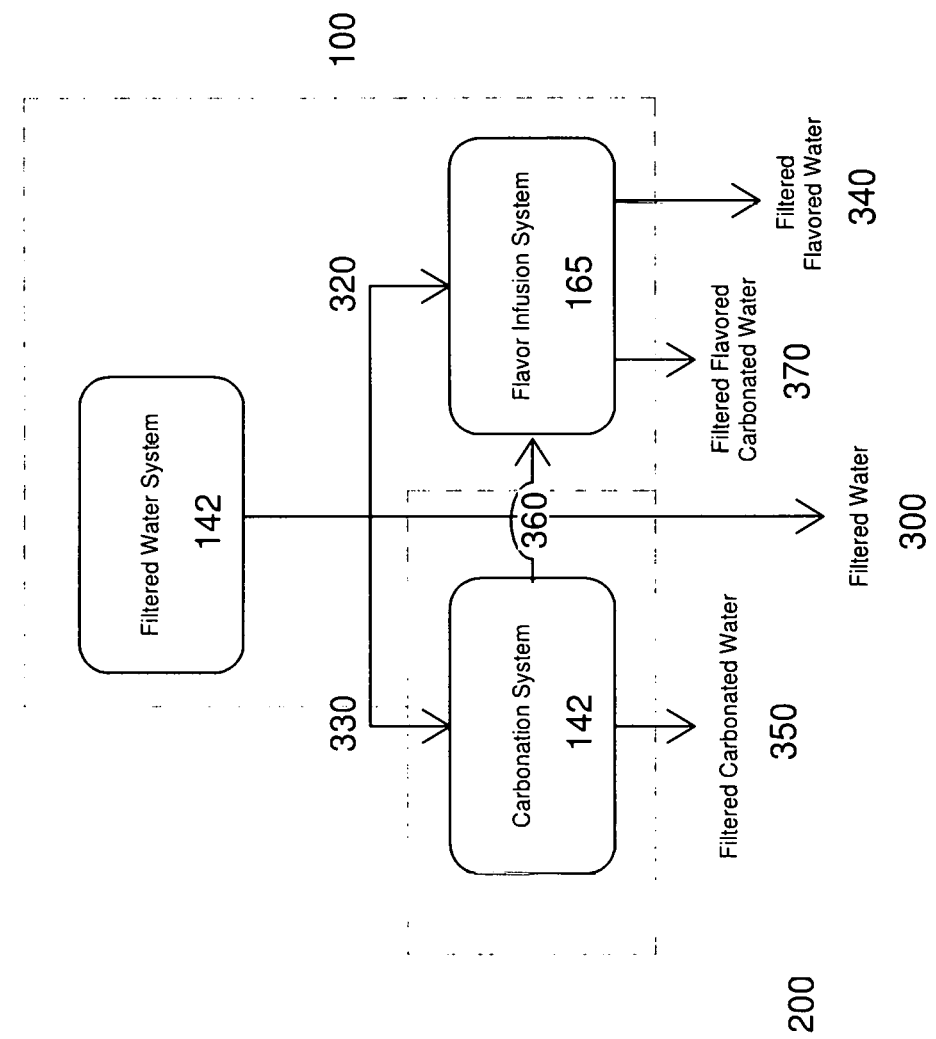
FIG. 1 is a an overall system architecture schematic of the system for making beverages, in accordance with the embodiments described herein.
Figure 2:
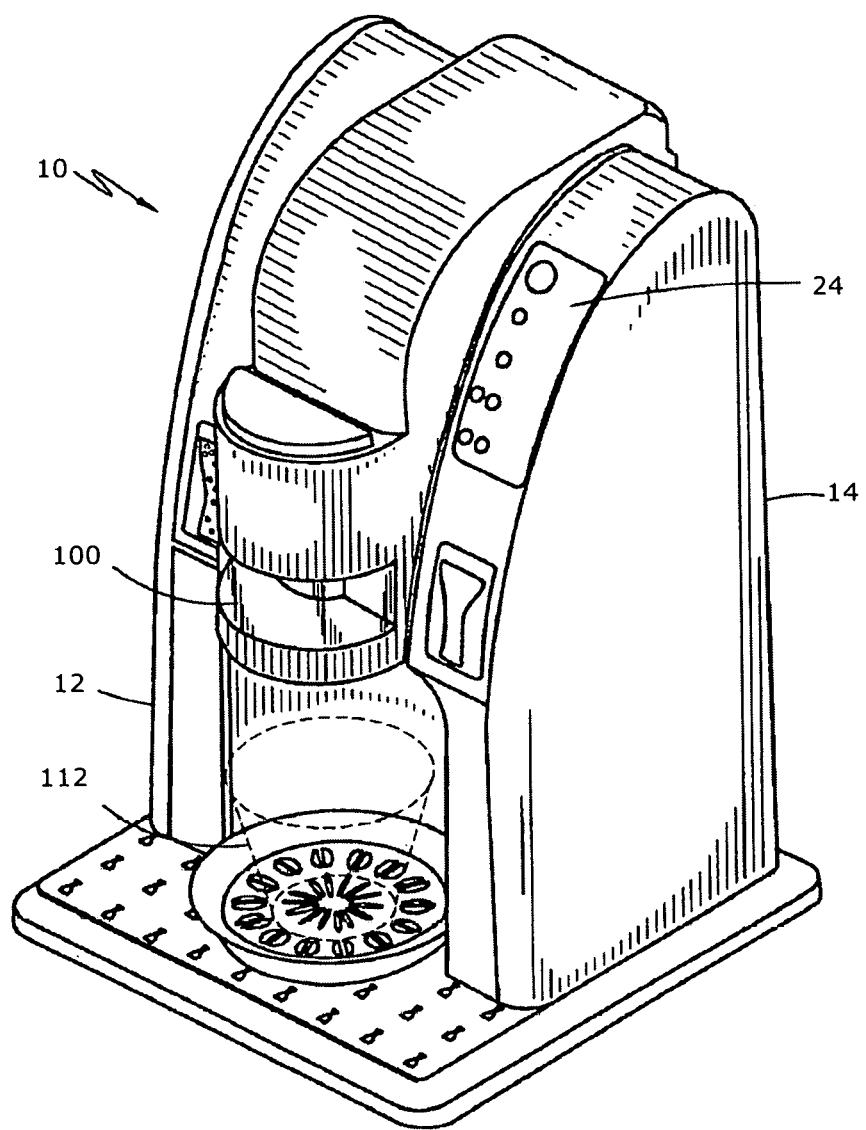
FIG. 2 is a front perspective view of a select serving, flavored and/or sparkling beverage maker according to the preferred embodiment of the present invention.

Referring now to the figures, a preferred embodiment of an in-situ counter top beverage maker for filtered uncarbonated and/or carbonated beverages, hereinafter referred to generally as a cold beverage maker generally noted as 10, is provided. As shown in conjunction with FIG. 1, understanding of the operation schematic flow diagram is further provides in view of the overall system architecture schematic of the cold beverage system 10. The system 10 provides for uncarbonated beverages 100 and carbonated beverages 200. To do so a filtered water system 142 may directed provided three separate conditions: dispensed directly to provide filtered water 300; directed 320 to a flavor infusion system 165; or directed 330 to a carbonation system 200.

In directing filtered water 320 to a flavor infusion system 165 a user may alternately dispense filtered flavored water 340. In directing filtered water 330 to the carbonation system 200, filtered carbonated water may be dispensed 350. Alternately, filtered carbonated water may be alternately directed 360 to the flavor infusion system 165 for dispensing of filtered, flavored carbonated water 370.

Referring now to FIG. 2 through FIG. 9, a preferred embodiment of a select serving, flavored and/or sparkling beverage maker, hereinafter referred to generally as a sparkling beverage maker 10. Both the front portion 12 is segmented generally into a control area 14, a mixing area 16, and a filling area 18. The control area 14 houses the carbonator 20, the chiller 22, the high pressure filter assembly 140 and the operational control unit 24 which houses a Central Processing Unit, the operation of which is described in greater detail below. The mixing area 16 provides for the mixing of flavors, filtered water, and carbonation, the operation of which is also described in greater detail below. The filling area 18 incorporates the water reservoir 30 and pumps to provide beverage mixing water for the creation of carbonated and non-carbonated, chilled flavored beverages.

Figure 6:
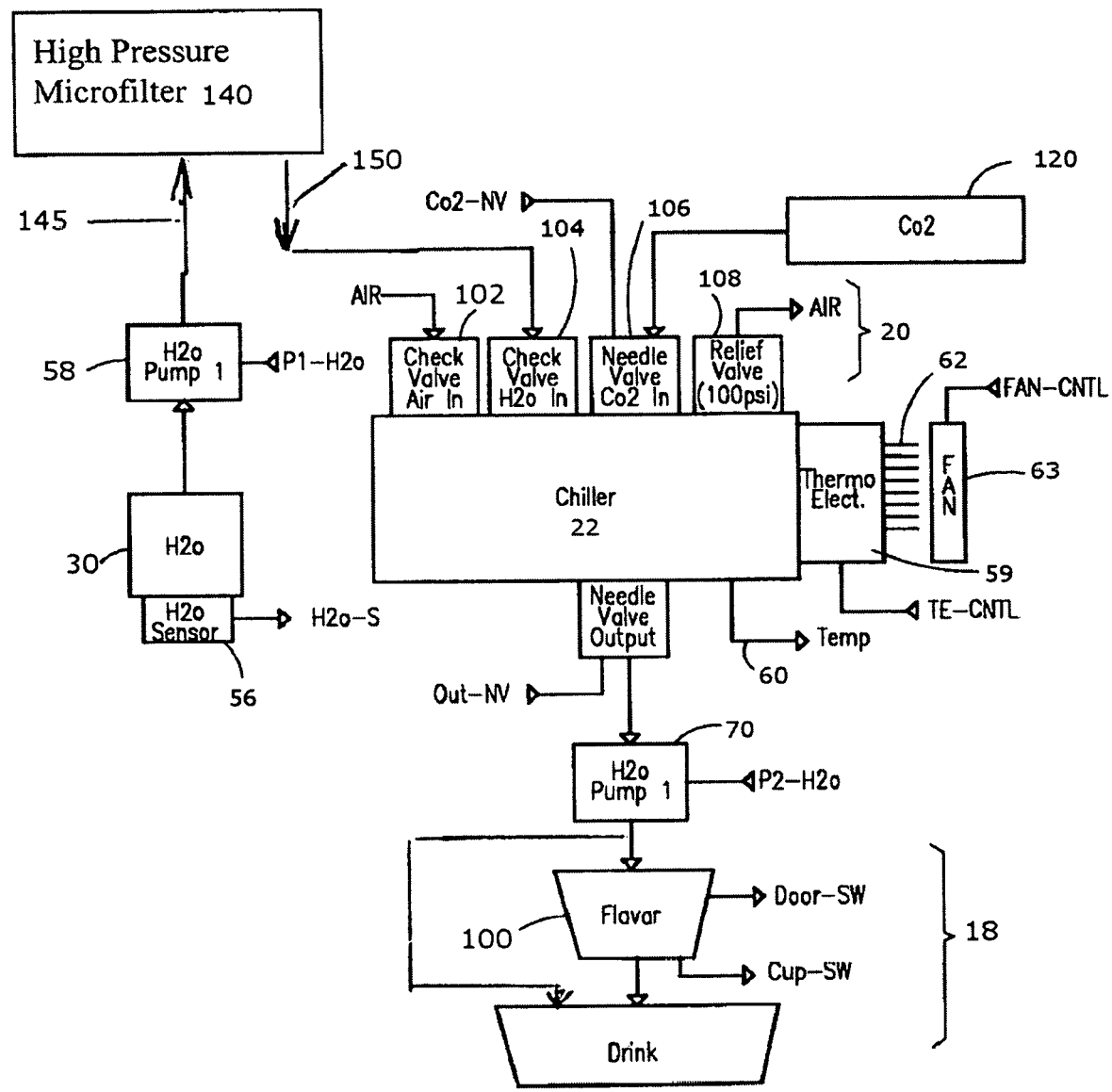
FIG. 6 is a block diagram of the operational schematic for use therewith.
Figure 7A:
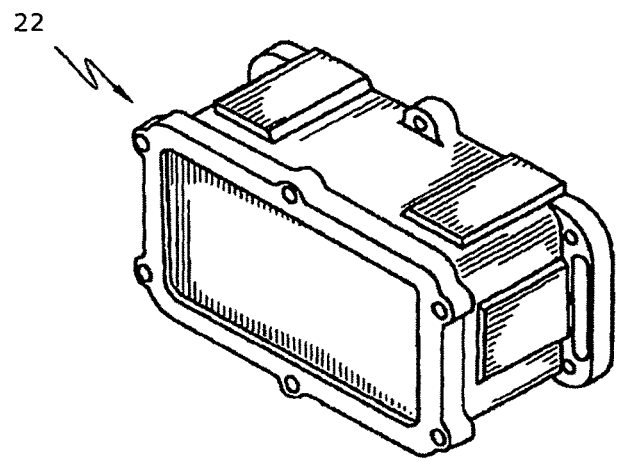
FIG. 7a through 7d are perspective, elevational, and plan views of a chiller unit 22 for use therein.
Figure 7B:
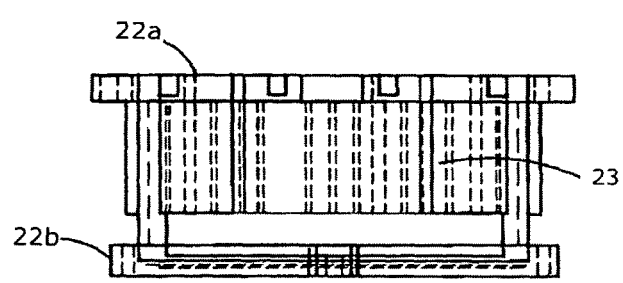
Figure 7C:
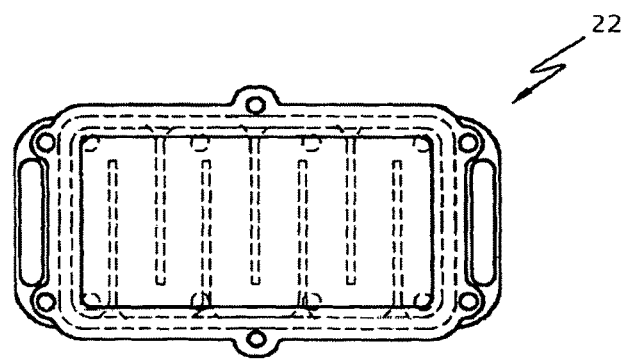
Figure 7D:
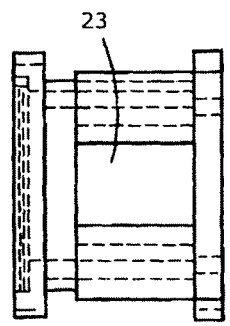
Figure 8:
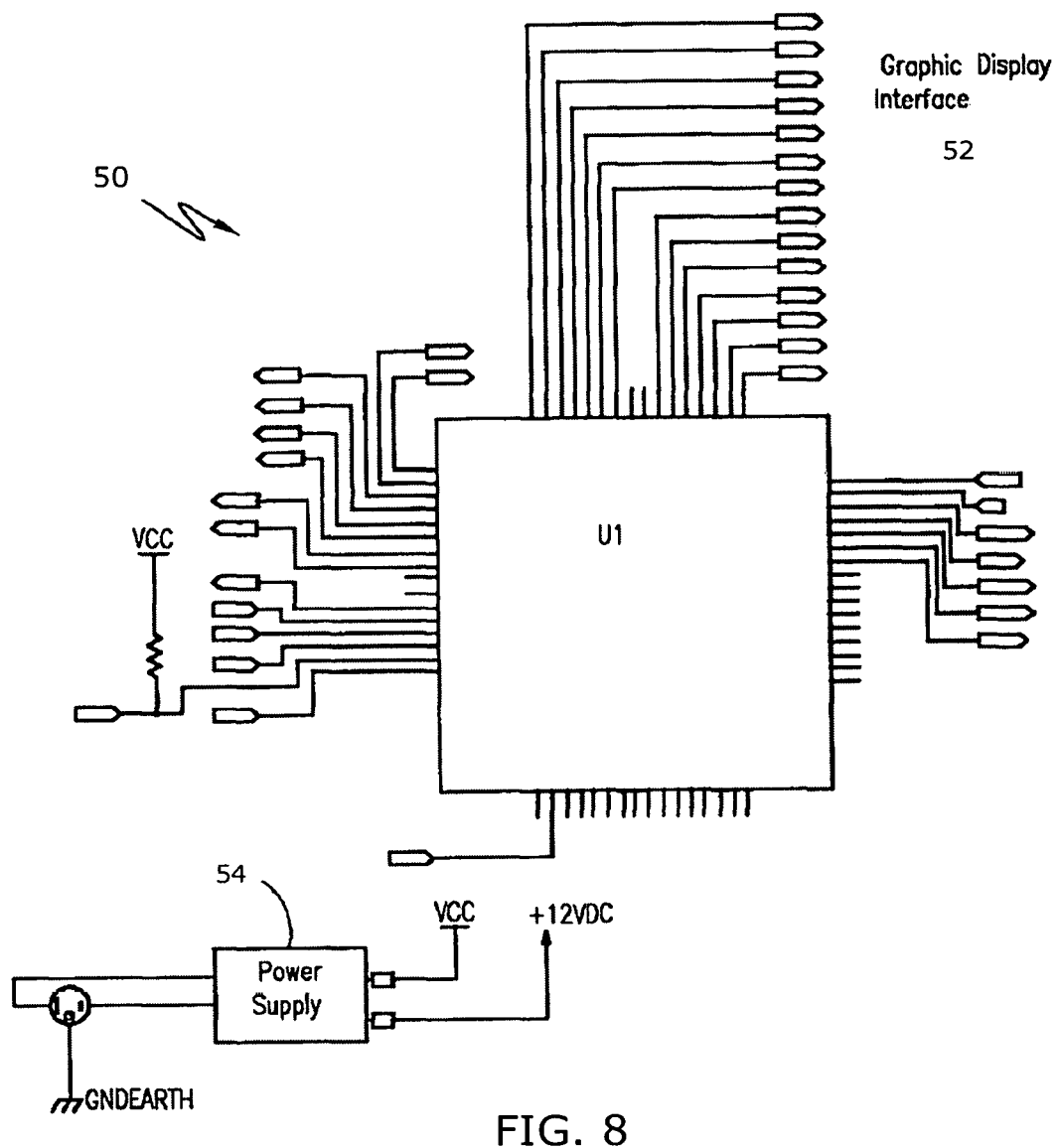
FIG. 8 is a schematic drawing of a Central Processor Unit 50 for use therewith.
Figure 9:
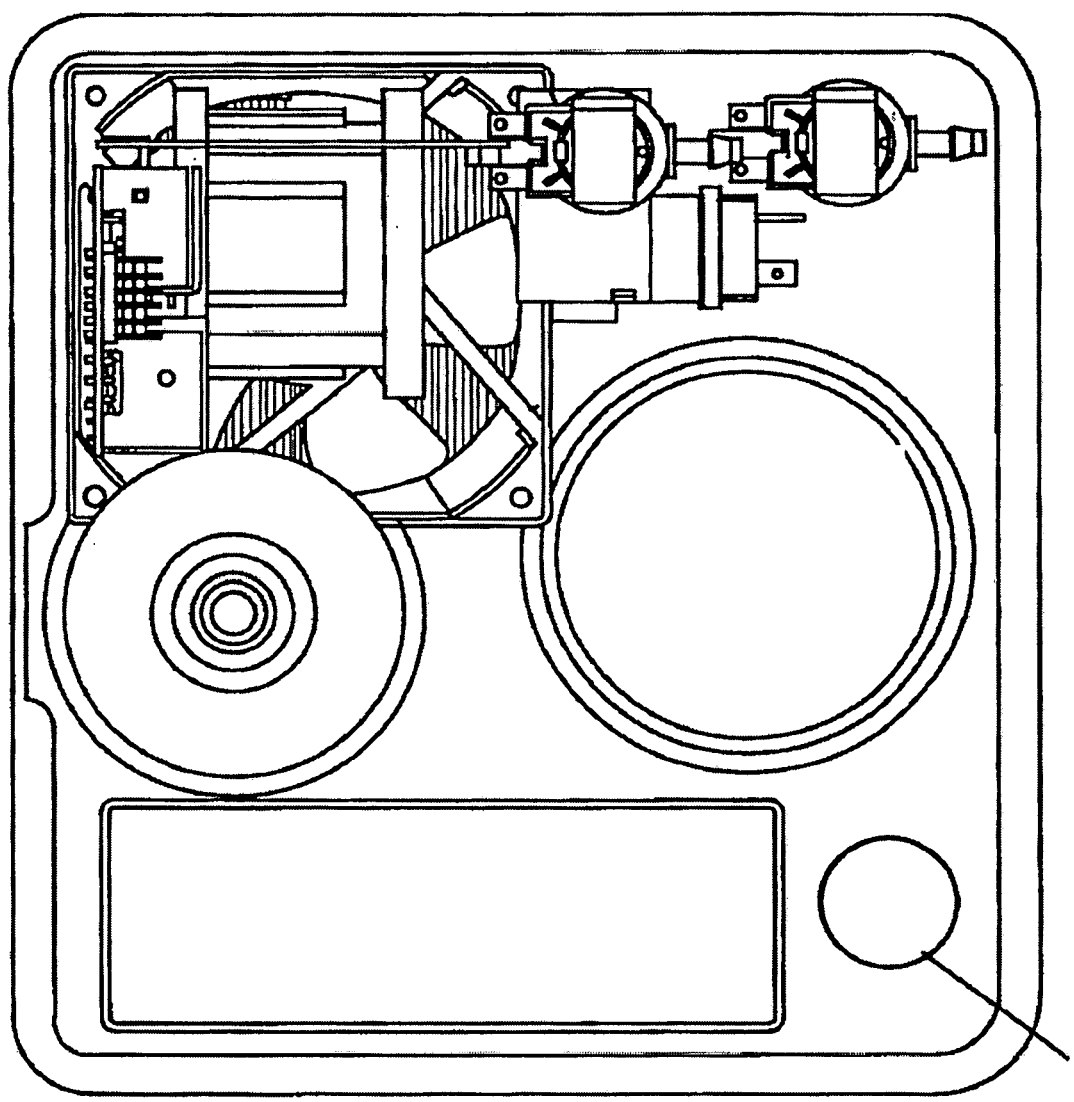
FIG. 9 is a cut away top plan view of a select serving, flavored and/or sparkling beverage maker according to the preferred embodiment of the present invention.
Figure 10A:
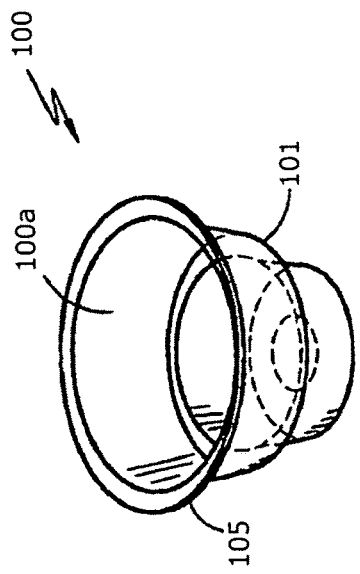
FIG. 10a through 10c are perspective, top plan and side elevational views, respectively, of a flavor cup 100 for use therewith is shown.
Figure 10C:
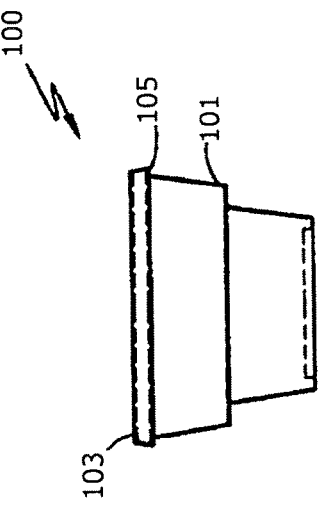
Figure 10B:
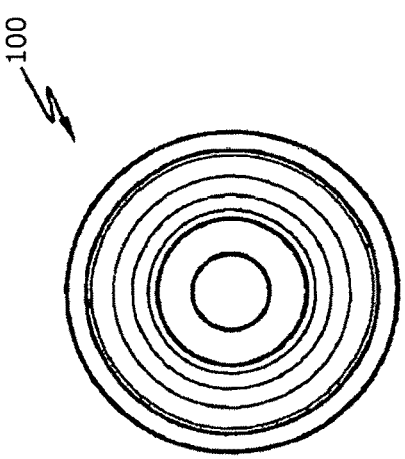

In conjunction with FIGS. 6 and 8, the sparkling beverage maker 10 incorporates the Central Processing Unit, or CPU 50 for operationally controlling all of the internal controls. When the beverage maker 10 is activated, a user interface displaced on the operational control unit 24 will indicate status, cycle step and operation by use of illuminated LED driven directly from the internal power supply 54. Immediately afer power is applied the unit senses the present of the water within the water reservoir 30 through a water level sensor 56. In the enclosed example shown for purpose of enabling a preferred embodiment, the water reservoir 30 is anticipated as having a 64 ounce capacity and can be capable of containing a replaceable filter through which water will communicate. The use of a translucent chamber wall will allow for visual inspection of the remaining water capacity. The water level will be sensed in order to manage the fill/dispensing operations property, as disclosed below.

While a number of sensors are equivalent, a float sensor 56 will trip if the water level gets too low or the chamber is removed. Alternately or additionally, an infra red LED and IR sensitive transistor can also form a sensing function for the present of a properly seated reservoir containing liquid.

A first water pump 58 is used to move water from the reservoir 30 through the high pressure microfilter 140 and then to the chiller 22. Under direct control of the CPU 50, the volume of water to be moved can be controlled as variable, or can be implemented as a constant volume feed for each cycle. Pumped to the chiller 22, the chiller 22 incorporates a thermoelectric cooler 59 that is used to chill the water to the prescribed temperature. Temperature is sensed by a positive temperature coefficient resistor 60 bonded to the chiller. As shown in conjunction with FIG. 7a through FIG. 7d, the chiller 22 utilizes a chiller box 22a forming an operative chilling volume 23 sealed by a chiller lid 22b such that the operative chilling volume 23 corresponds to a cycle volume for each chilled (or heated) beverage. As can be seen by one skilled in the art, the present teachings are similarly capable of chilling or heating the beverage through the use of a thermoelectric heat transfer unit. For use in cooling, a heat sink 62 on the 'hot' side allows fresh air to be forced across by a fan 63 under the control o the CPU 50. The fan 63 under control of the CPU, can be cycled on an off during operation.

As part of a key aspect of the present invention the use of microfilters 140 are to be provided for operation under pressure in a manner that provides for certification of contaminant reduction claims. In order to accomplish such performance various options may be implemented. According to one aspect of such operation a pressurize microfilter having a block dimension of 2.1"OD×1"ID×2.6"L may be selected in conjunction with a performance indicator device order to provide for NSF/ANSI Standard 42 or NSF/ANSI Standard 53 health claims when operated at a flow rate of 0.50 gallons per minute (gpm). Such contaminant removal performance of such a configuration may make those claims of unhealthy contaminant removal performance as shown in conjunction with TABLE 1. In an alternate aspect that may provide for reduction of a larger range of impurities, a pressurized microfilter having a block dimension of 2.1"OD×1"ID×4.5"L may be selected in conjunction with a performance indicator device order to provide for NSF/ANSI Standard 42 or NSF/ANSI Standard 53 health claims when operated at a flow rate of 0.50 gallons per minute (gpm). Such contaminant removal performance of such a configuration may make those claims of unhealthy contaminant removal performance as shown in conjunction with TABLE 2.

TABLE 1

| Test | Flow Rate | Gallons |
|---|---|---|
| Std. 53 - Lead pH 6.5 Reduction | 0.5 | 400 |
| Std. 53 - Mercury pH 6.5 Reduction | 0.5 | 400 |
| Std. 53 - Atrazine Reduction | 0.5 | 400 |
| Std. 53 - Toxaphene Reduction | 0.5 | 400 |
| Std. 53 - 2,4-D Reduction | 0.5 | 400 |
| Std. 53 - Lead pH 8.5 Reduction | 0.5 | 400 |
| Std. 53 - Mercury pH 8.5 Reduction | 0.5 | 400 |
| Std. 53 - Benzene Reduction | 0.5 | 400 |
| Std. 53 - Endrin Reduction | 0.5 | 400 |
| Std. 53 - Carbofuran Reduction | 0.5 | 400 |
| Std. 53 - Ethylbenzene Reduction | 0.5 | 400 |
| Std. 53 - o-Diclorobenzene Reduction | 0.5 | 400 |
| Std. 53 - Turbidity Reduction | pass | |
| Std. 53 - Chlorine Reduction | 0.85 | 400 |
| Std. 42 Particulate Class I Reduction | pass | |
| Std. 53 - Cyst Reduction | pass | |
| Std. 53 - Asbestos Reduction | pass | |

TABLE 2

| Test | Flow Rate | Gallons |
|---|---|---|
| Std. 53 - Lead pH 6.5 Reduction | 0.5 | 400 |
| Std. 53 - Mercury pH 6.5 Reduction | 0.5 | 400 |
| Std. 53 - Atrazine Reduction | 0.5 | 400 |
| Std. 53 - Toxaphene Reduction | 0.5 | 400 |
| Std. 53 - 2,4-D Reduction | 0.5 | 400 |
| Std. 53 - Lead pH 8.5 Reduction | 0.5 | 400 |
| Std. 53 - Mercury pH 8.5 Reduction | 0.5 | 400 |
| Std. 53 - Benzene Reduction | 0.5 | 400 |

TABLE 2-continued

| Test | Flow Rate | Gallons |
| --- | --- | --- |
| Std. 53 - Endrin Reduction | 0.5 | 400 |
| Std. 53 - Carbofuran Reduction | 0.5 | 400 |
| Std 53 - Ethylbenzene | 0.5 | 400 |
| Std. 53 - o-Diclorobenzene Reduction | 0.5 | 400 |
| Std. 53 - Turbidity Reduction | pass | |
| Std. 53 - Chlorine Reduction | 0.85 | 640 |
| Std. 42 Particulate Class I Reduction | pass | |
| Std. 53 - p-Dicholobenzene Reduction | 0.5 | 600 |
| Std. 53 - Cyst Reduction | pass | |
| Std. 53 - Asbestos Reduction | pass | |
| Std. 53 - Styrene Reduction | 0.5 | 400 |
| Std. 53 - Tetrachloroethylene Reduction | 0.5 | 600 |
| Std. 53 - Chlorobenzene Reduction | 0.5 | 600 |
| Std. 53 - Alachlor Reduction | 0.5 | 600 |
| Std. 53 - Lindane Reduction | 0.5 | 400 |
| Std. 53 - Cadmium pH 6.5 Reduction | 0.5 | 120 |
| Std. 53 - Cadmium pH 8.5 Reduction | 0.5 | 120 |
| Std. 53 - MTBE Reduction | 0.5 | 120 |
| Std. 53 - TTHM Reduction | 0.5 | 120 |
| Std. 53 - VOC Reduction | 0.5 | 260 |

The use of pressurized micro filters in conjunction with a performance monitoring and indication allows for certification of contaminant reduction claims up through 80% of the filter life. So, for example, if a selected filter is rated for up to 400 gallons of use, certification of contaminant reduction may be claimed up through 320 gallons of use. While various options may be available for monitoring such performance, one manner of identifying when the functional life of a filter has been exhausted may include monitoring of post-filter pressure or maintaining a throughput volumetric count as a running total of volume between filter cartridge changes. Such volumetric counting may be implemented by identifying and counting the number of single serve operational uses through the system 10 as compared to a the functional filter life limit, or by counting down from such a functional filter life limit in order to annunciate to the user an indication of a required filter cartridge replacement in order to maintain intended filtration effectiveness.

A second water pump 70 is used to dispense the contents of the chiller through a flavor cup 100 as described in greater detail below. Dispensed under pressure, this second water pump 70 is operated after the chiller 22 is filled, reaches temperate, and is carbonated if so selected. This pump 70 will run slightly longer than necessary in order to fully dispense and purge the chiller 22, flavor cup 100 and all communicated operative plumbing.

2. Operational Overview

A select serving, flavored and/or sparkling beverage maker 10 of the present invention is a new appliance that creates a new product category in the home appliance industry. Including the capacity for custom formulations of flavor for single cup/glass on demand dispensing, the dispenser 10 will incorporate a $CO_2$ gas cylinder for selectively carbonating each beverage. To accomplish this, several features are anticipate. These include the following.

An air inlet check valve or chiller vent 102 must close to allow $CO_2$ to be injected to the chiller during carbonation, and open under negative pressure from the second water pump 70 to allow air into the chamber 23 to allow the chiller contents to be pumped through the flavor cup 100 and eventually into the user's drinking container 112.

A water inlet check valve 102 is opened under positive pressure from the first water pump 58 to allow water to enter the chiller 22 from the water reservoir 30. When this pump is off, the valve 102 automatically closes to allow $CO_2$ to be injected into the chiller 22.

A $CO_2$ needle valve 106, functioning as carbonation control means, allows $CO_2$ to enter the chiller 22 and carbonate the water prior to dispensing through the flavor cup 100. This feature is optional and is a function of a front panel control selection to the CPU. If carbonation is selected, the chiller 22 will be filled with water, less the volume of the flavor cup 100, and then the water check valve 104 closed. $CO_2$ is optionally injected into the chiller, causing carbonation. This action may be delayed if the water temperature in the chiller has not reached the appropriate temperature.

A relief valve 108 is shown as a safety precaution against over-pressurizing the chiller form the $CO_2$ source.

An output needle valve 112 is desired to resist CO, injection pressure during carbonation. It is opened under CPI control to allow dispensing, and closed during carbonation.

Finally, a $CO_2$ Chamber 120 is required as a replaceable, disposable supply of carbonating gas. While various available or proprietary supplies are envisioned, the present invention in its preferred embodiment anticipates adapting to use commercially available chambers of a standard size that have been popularized by paint ball enthusiast. Such chambers are easy to acquire and already comprise a commercial infrastructure for economically efficient refilling.

3. Flavor Cups

As shown in FIG. 11a through 11c, the use of individually packed, single use disposable flavor cups 100 are anticipated which include a mixing area 100 a of a volume greater than the volume that will be filled with the flavors of choice to make sparkling flavored water and a syrup to make vitamin fortified and mineral added, low sugar soda pop. By way of example, in the preferred embodiment a flavor cup 100 would have a capacity of slightly more than 1 oz, but will be filled with 1 oz. syrup flavor concentrate having a custom vacuum formed design to incorporate a indexing ridge 101, a sealed foil cover 103 covers and seals the flavor cup 100. When placed in the mixing chamber 12, the foil 103 is pierced on the top and, in doing so, will allow the cup to move downward and be pierced a second time from the bottom. An upper peripheral flange 105 therein support the cup. When the piercing needle approaches from the top of the cup, it will be engaged and sealed about its perimeter by the foil and around the piercing cite. The flavor cup 100 thereafter functions as a mixing chamber for carbonated or noncarbonated chilled water and flavor syrup.

4. Operation of the Preferred Embodiment

The present invention provides a novel means to make a customized single-serving of chilled, sparkling beverage at home. A complete line of home, office and commercial appliances will have the basic attributes of a Sparkling Beverage Maker that will:

Give the consumer the ability to make on demand his/her choice of beverage in a single-service glass either a plain filtered water, a flavored filtered water, a filtered sparkling water with or without flavor, a sparkling fruit juice or an enhance soft drink, low in sugar with vitamins and minerals.

Give the consumer to ability to regulate and control the beverage temperature.

Give the consumer the ability to regulate the level of carbonation from low, medium and high.

Give the consumer the ability to choose and regulate the flavor of sparkling water as the dispensing takes place for a continual and immediate freshness.

Give the consumer the ability to switch over to making a sparkling fruit juice.

Gives the consumer the ability to switch over to making a healthy soda pop.

Give the consumer the luxury of benefitting from these single-serving glasses, on-demand, at a push of a button freshness, eliminating waste due to loss of carbonation going flat at a fraction of the cost of store-bought beverages.

The foregoing descriptions of specific embodiments of the present invention have been presented for the purposes of illustration and description. They are neither intended to be exhaustive nor to limit the invention to the precise forms disclosed and, obviously, many modifications and variations are possible in light of the above teaching. The embodiments were chosen and described in order to best explain the principles of the invention and its practical application, to thereby enable others skilled in the art to best utilize the invention and the various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A beverage maker capable of making customized beverages, said beverage maker comprises:
    a potable water source configured to provide pressurized water;
    a filter system in fluid communication with and for processing said pressurized water between said potable water source and a chiller, said filter system comprises a performance monitoring system that allows for certification of a filter system performance for a claimed contaminant reduction up through 320 gallons of use;
    the chiller in fluid communication with the filter system and configured to receive a selected volume of water, wherein the chiller is configured to modify the temperature of the selected volume to a prescribed temperature;
    a carbon dioxide source in fluid communication with the chiller and configured to selectively provide carbon dioxide to the chiller;
    a single use disposable flavor cup containing a flavor and having a sealed cover that covers and seals said flavor cup;
    a water injection nozzle configured to access said flavor cup, wherein the water injection nozzle is in fluid communication with the chiller and is configured to operatively charge said flavor cup with the selected volume of the chiller so as to mix the selected volume with the flavor within the flavor cup to form a single-serving, on-demand volume of a flavored beverage; and
    a discharge port for dispensing the flavored beverage from said flavor cup.

2. The beverage maker capable of making customized beverages of claim 1, wherein said selected volume of water from said chiller further comprises:
    a directed output in fluid communication with said discharge port; and
    an alternate directed output in fluid communication with said a water injection nozzle through said flavor cup.

3. The beverage maker of claim 2, wherein said filtered water system further comprises at least one replaceable microfilter for operation under pressure in a manner that provides for certification of contaminant reduction claims.

4. The beverage maker of claim 3, wherein said at least one replaceable microfilter as a form factor fitting within a volume selected from a group comprising: a block dimension of 2.1"OD×1"ID×2.6"L; and a block dimension of a 2.1"OD×1"ID×4.5"L.

5. The beverage maker of claim 3, wherein said at least one microfilter provides NSF/ANSI Standard 42 or NSF/ANSI Standard 53 health claims when operated at a flow rate of 0.50 gallons per minute (gpm).

6. The beverage maker of claim 4, wherein said at least one microfilter has a contaminant removal performance selected from the group comprising: Std. 53—Lead pH 6.5 Reduction; Std. 53—Mercury pH 6.5 Reduction; Std. 53—Atrazine Reduction; Std. 53—Toxaphene Reduction; Std. 53—2,4-D Reduction; Std. 53—Lead pH 8.5 Reduction; Std. 53—Mercury pH 8.5 Reduction; Std. 53—Benzene Reduction; Std. 53—Endrin Reduction; Std. 53—Carbofuran Reduction; Std. 53—Ethylbenzene Reduction; Std. 53—o-Diclorobenzene Reduction; Std. 53—Turbidity Reduction; Std. 53—Chlorine Reduction; Std. 42 Particulate Class I Reduction; Std. 53—Cyst Reduction; and Std. 53—Asbestos Reduction.

7. The beverage maker of claim 4, wherein said at least one replaceable microfilter has a contaminant removal performance selected from the group comprising: Std. 53—Lead pH 6.5 Reduction; Std. 53—Mercury pH 6.5 Reduction; Std. 53—Atrazine Reduction; Std. 53—Toxaphene Reduction; Std. 53—2,4-D Reduction; Std. 53—Lead pH 8.5 Reduction; Std. 53—Mercury pH 8.5 Reduction; Std. 53—Benzene Reduction; Std. 53—Endrin Reduction; Std. 53—Carbofuran Reduction; Std 53—Ethylbenzene; Std. 53—o-Diclorobenzene Reduction; Std. 53—Turbidity Reduction; Std. 53—Chlorine Reduction; Std. 42 Particulate Class I Reduction; Std. 53—p-Dicholobenzene Reduction; Std. 53—Cyst Reduction; Std. 53—Asbestos Reduction; Std. 53—Styrene Reduction; Std. 53—Tetrachloroethylene Reduction; Std. 53—Chlorobenzene Reduction; Std. 53—Alachlor Reduction; Std. 53—Lindane Reduction; and Std. 53—Cadmium pH 6.5 Reduction.

8. The beverage maker of claim 6, wherein said at least one replaceable microfilter is capable of contaminant removal performance selected from the group comprising: Std. 53—Lead pH 6.5 Reduction; Std. 53—Mercury pH 6.5 Reduction; Std. 53—Atrazine Reduction; Std. 53—Toxaphene Reduction; Std. 53—2,4-D Reduction; Std. 53—Lead pH 8.5 Reduction; Std. 53—Mercury pH 8.5 Reduction; Std. 53—Benzene Reduction; Std. 53—Endrin Reduction; Std. 53—Carbofuran Reduction; Std. 53—Ethylbenzene Reduction; Std. 53—o-Diclorobenzene Reduction; Std. 53—Turbidity Reduction; Std. 53—Chlorine Reduction; Std. 42 Particulate Class I Reduction; Std. 53—Cyst Reduction; and Std. 53—Asbestos Reduction.

9. The beverage maker of claim 1, wherein said performance monitoring system further comprises a filter performance exhaustion indicator selected from the group comprising: a post-filter pressure indicator; and a throughput volumetric indicator.

10. The beverage maker of claim 5, wherein said flavor cup contains a selected flavored syrup.

11. The beverage maker of claim 10, wherein said syrup is fortified with at least one of vitamins, herbs, or minerals.

12. The beverage maker of claim 2 further comprising operative controls for selectively engaging said carbon dioxide source as desired.

13. The beverage maker of claim 1, wherein said flavor cup functions as a mixing chamber for the selected volume from the chiller and the flavor.

14. The beverage maker of claim 2, wherein said flavor cup functions as a mixing chamber for the selected volume from the chiller and the flavor.

15. The beverage maker of claim 12, wherein said flavor cup functions as a mixing chamber for the selected volume from the chiller and the flavor.

16. The beverage maker of claim 1 further comprising a temperature sensor configured to measure the temperature of the selected volume within the chiller.

17. The beverage maker of claim 2 further comprising a temperature sensor configured to measure the temperature of the selected volume within the chiller.

18. The beverage maker of claim 2 further comprising a user interface configured to indicate status of the customized beverage.

19. The beverage maker of claim 1, wherein the chiller comprises a thermoelectric cooler.

20. The beverage maker of claim 2, wherein the chiller comprises a thermoelectric cooler.

* * * * *